United States Patent Office 3,493,480
Patented Feb. 3, 1970

3,493,480
COMPOSITION CONTAINING POLYPROPYLENE-VINYLPYRIDINE-ACRYLATE ESTER GRAFT COPOLYMER
Toshihiko Kuroda, Yoshinori Matsushima, Yujiro Nakayama, and Isao Toshima, Yokkaichi-shi, Japan, assignors to Mitsubishi Petrochemical Company, Limited, Tokyo, Japan
No Drawing. Filed Sept. 1, 1966, Ser. No. 576,562
Int. Cl. C08f *1/16*
U.S. Cl. 204—159.17    3 Claims

ABSTRACT OF THE DISCLOSURE

A polypropylene composition comprising polypropylene and a polypropylene graft-copolymerized with a vinylpyridine and an acrylic ester, the grafting being effected by ionizing radiation. This composition displays superior dyeability not only to polypropylene but also to the above composition wherein the graft-copolymerized polypropylene has been copolymerized only with one of the vinylpyridine or acrylic ester.

---

This invention relates to polypropylene compositions, and more particularly, it relates to polypropylene compositions having improved adhesiveness, printability, dyeability, oil resistance and antistatic properties.

Although polypropylene is known to have excellent physical properties such as a low specific gravity, a high mechanical strength, a high heat resistance, etc., on the other hand, it is lacking adhesiveness, printability, dyeability, oil resistance and antistatic properties as can be readily understood from the paraffinic structures. Thus, the applicability of this otherwise useful polymer has been greatly restricted.

There have been proposed various methods to eliminate these disadvantages inherent to polypropylene as mentioned above. In order to improve the adhesiveness and printability, for example, an electric discharge, a flame treatment, an acid treatment, etc. have been proposed.

Further, for the improvements in dyeability and antistatic properties, there have been proposed the mixing of other high or low molecular weight compounds having a high dyeability with polypropylene, a chemical modification, copolymerization, graft copolymerization, etc.

Nowadays, commercially available printable polypropylene films and dyeable polypropylene filaments are manufactured by the electric discharge method and a method involving the mixing of dyeable high or low molecular weight compounds with polypropylene, respectively.

In these processes, however, there still is a considerable room for further improvements in view of the quality of the products and the manufacturing cost. For example, the method involving the mixing of high or low molecular weight compounds having a high dyeability with polypropylene as mentioned above gives rise to problems as to the separation of these high or low molecular weight compounds from polypropylene to form different phases, bleeding or migration of low molecular weight compounds, etc., which lead to an unlevel dyeing, fading of colors.

Although an attempt has been made to introduce a dyeable group to polypropylene by a chemical reaction, polypropylene is not easily susceptible to such reaction with the exception of chlorination, chlorosufonation and oxidation. Further, an improvement of dyeability involving the copolymerization of gaseous propylene with dyeable vinyl compounds has disadvantage in that the stero-specific regularity characteristic of polypropylene is decreased and thus the filamentary characteristics are lost.

As the graft copolymerization of polypropylene, the oxidation method, or a method involving an irradiation of ultraviolet rays or an ionizing radiation are known heretofore. For example, there has been proposed a method to graft vinyl compound under the conditions wherein polypropylene is brought into contact therewith in the presence of air and under irradiation of an ionizing radiation thereon. Alternatively, the graft copolymerization may be effected by subjecting polypropylene to the irradiation of an ionizing radiation prior to the contacting with vinyl compound and thereafter bringing the irradiated polypropylene into contact with vinyl compound. A drawback of these processes as described above is that the quality of the produced grafted polymer is usually unsatisfactory. The reason is that the molecular weight of polypropylene is decreased in these processes and thus the mechanical and thermal properties are degraded accordingly; and that the polymerization of monomeric vinyl compound is initiated by OH radical released from the main polymeric chain to produce homopolymer of vinyl compound which in turn intermixes with the desired grafted polymer. Hence, in order to obtain a pure grafted polymer, it is necessary to eliminate said homopolymer of vinyl compound and this elimination involves a great technical difficulty. Even if such technical difficulty has been overcome, the increase in the production cost due to the complicated post-treatment is a matter of inevitability and thus account for the reason why there is no commercially available polypropylene graft copolymers.

It is, therefore, an object of this invention to provide polypropylene compositions of a high quality free from any disadvantages as described above at low cost.

We have found out that polypropylene compositions having improved properties as mentioned above may be obtained without sacrificing desirable mechanical and thermal properties which are inherent to polypropylene by preparing a graft-copolymerized polypropylene under a particular reaction condition and mixing the untreated polypropylene therewith.

That is, in accordance with this invention, there is provided a novel polypropylene composition having improved adhesiveness, printability, dyeability, oil resistance and antistatic properties while retaining the desirable mechanical and thermal properties which are inherent to polypropylene, which comprises preparing a grafted-copolymerized polypropylene under a low temperature which has not been used heretofore and mixing the untreated polypropylene therewith.

A feature of this invention is that polypropylene compositions having improved physical properties as mentioned above are obtained at low cost and free from any degradation in the mechanical and thermal properties by mixing a minor portion of expensive graft-copolymerized polypropylene with a major portion of ordinary inexpensive polypropylene.

More particularly, polypropylene compositions of this invention is obtained by subjecting powdered polypropylene to the irradiation of an ionizing radiation at a temperature lower than 5° C., thereafter graft-copolymerizing from 5 to 80% by weight of vinyl compound based on the weight of said polypropylene therewith, and finally mixing the resulting graft-copolymerized polypropylene with polypropylene so that the weight of grafted vinyl compound may be from 1 to 8%, except for co-grafting vinylpyridine and acrylic ester wherein the weight thereof should be from 0.5 to 10%, based on the total weight of the resulting composition.

When polypropylene is irradiated with an ionizing radiation at a low temperature according to this invention, the subsequent graft copolymerization may be effected at temperatures below 40° C. due to the fact that the active center produced by the reaction is a peroxide radical. This is a great advantage of this invention in that by lowering the graft copolymerization temperature, the formation of homopolymer of vinyl compound which is possible at a high temperature may also be prevented as well.

In accordance with this invention, as noted above, novel polypropylene compositions having improved properties as mentioned above may be obtained without degrading the desirable mechanical and thermal properties which are inherent to polypropylene by preparing grafted polypropylene copolymer which contains no homopolymer of vinyl compound and having a low degree of degradation by the irradiation of an ionizing radiation at a low temperature in the presence of air and mixing a minor portion of the resulting grafted polypropylene copolymer with a major portion of ordinary polypropylene.

The term "polypropylene" as used herein implies crystalline, amorphous or partially crystalline polypropylene.

The term "graft copolymer" as used herein implies polypropylene grafted with one or more of vinyl compound by radical polymerization. Vinyl compounds which may be grafted to polypropylene in this invention include, for example, vinylpyridine, methylvinylpyridine, ethylvinylpyridine, vinylpyrrolidone, vinylcarbazole, vinylidene cyanide, acrylonitrile, acrylic acid, methyl acrylate, ethyl acrylate, methacrylic acid, ethacrylic acid, methyl methacrylate, ethyl methacrylate, vinylformate, vinyl acetate, vinyl chloroacetate, vinyl cyanoacetate, vinyl propionate, vinyl benzoate, allyl acetate, styrene, methylchlorostyrene and the like.

Among these vinyl compounds as exemplified as above, co-grafting of vinylpyridine and acrylic ester to polyproylene is particularly effective in improving the dyeability of polypropylene.

Vinylpyridines which may be used in this invention include, for example, 2-vinylpyridine, 4-vinylpyridine, 2-methyl-5-vinylpyridine, 2-ethyl-5-vinylpyridine and the like. Acrylic esters which may be used in this invention include, for example, methyl acrylate, ethyl acrylate, methyl methacrylate and the like.

The proportion of vinylpyridine to acrylic ester is in a ratio of 90–10:10–90, and most preferably 70–30:30–70, by weight. The content of acrylic esters less than 10% by weight gives only a poor improvement in a level dyeing, while, the content of more than 90% by weight requires excessively large total amount of vinylpyridine and acrylic ester to be co-grafted to polypropylene in order to graft a required amount of vinylpyridine, and thus the properties which are inherent to polypropylene are undesirably deteriorated. Further, with the content outside the range as specified above, the fastness to washing of a dyed fiber decreases as well.

The term "ionizing radiation" as used herein means a radiation having an energy at least capable of forming ions from atoms or molecules, or sufficient to break up the chemical bonds, and includes electronic rays, gamma ray, etc. As a source of gamma ray, the conventional radioactive isotopes, such as, for example, $^{60}$Co, $^{137}$Cs, $^{144}$Ce, $^{85}$Kr, $^{24}$Na and the like may be conveniently used.

Graft copolymers which may be used for the polypropylene compositions of this invention are prepared in the following manner:

Polypropylene is irradiated with an ionizing radiation of from 0.1M rad to 2M rad, and most preferably about 0.5M rad, at a temperature of from −100° to 5° C., and most preferably from −30° to 0° C., in the presence of oxygen. Polypropylene used in this invention is preferably in finely divided form in view of the graft polymerization and subsequent mixing operations. Immediately after the completion of the irradiation, or after preserving the active radical at a low temperature below −30° C., or after preserving said active radical at an ambient temperature for a short period of time, the irradiated polypropylene is immersed in the above-mentioned vinyl compound or solution thereof dissolved in a solvent such as methanol, ethanol, acetone, etc. and graft-polymerized at a temperature of from 5° to 70° C., and most preferably from 20° to 40° C.

The weight of vinyl compound grafted on polypropylene is from 5 to 80%, and most preferably from 10 to 30%, based on the weight of polypropylene.

Polypropylene compositions of this invention may be obtained by mixing the graft copolymerized polypropylene prepared as described above with polypropylene. The weight of vinyl compound component is from 1 to 8%, and most preferably from 3 to 5%, except for co-grafting vinylpyridine and acrylic ester wherein the weight of grafted vinylpyridine is preferably from 0.5 to 10%, based on the total weight of the resulting polyproylene compositions.

The dispersion of graft copolymerized polypropylene of this invention in polyproylene is quite good, unlike when mixing other high molecular weight compound or graft copolymer prepared in other methods than in this invention, and any phase separation does not take place.

Any antioxidants, light stabilizers and other additives may be added to polypropylene compositions of this invention, if desired.

Mixing may be effected by using ribbon mixers, spur mixers, Banbury mixers, V blenders and the like and the product may be pelletized by an extruder thereafter. However, this invention is not restricted by the mixing methods as exemplified above.

The dyeing test has been carried out in the following manner:

Several grams of press-sheet having a thickness of 0.1 mm. were immersed in a dyeing bath and allowed to stand for 1–3 hours at suitable temperatures below 100° C. Thereafter, visible ray spectra of the dyed sheet were measured and from the decrease in light absorption and visible inspection, the transfer and absorption of dyestuff to the compositions of this invention were confirmed. The printability was tested by applying a printing ink on the surface of 0.15 mm. thickness press-sheet which was then allowed to stand overnight in a room maintained at 20°C. and 50% humidity. Thereafter, an adhesive tape was contacted on the surface and peeled off to judge the printability by measuring the area of ink layer left unpeeled on the surface of said sheet.

Antistatic property was tested in the method as described in Example 4.

This invention will be explained more in detail in the following examples. However, it should not be construed that these examples restrict the present invention in any way as they are given merely by way of illustration.

EXAMPLE 1

20 g. of isotactic polypropylene having a density of 0.90 g./cm$^3$, an intrinsic viscosity of 1.38, and a particle size of finer than 150 mesh, were contained in a polyethylene bag having thickness of 0.05 mm. and the bag was placed in a vat-like container. While the container was cooled as low as −30° C. by Dry Ice-methanol, the content was subjected to the irradiation of an electronic ray of 0.5M rad emitted from a linear accelerator having an output of 750 w. Immediately after the completion of the irradiation, it was placed in 200 cc. of 2-vinylpyridine and the temperature was raised to 30° C. After allowed to stand for a predetermined period of time, polypropylene powder was taken out and homopolymer was extracted by acetone for 24 hours and dried.

The percentage of grafted 2-vinylpyridine was calculated from the increase in weight based on the weight of polypropylene.

The polymerization conditions and the results are shown in the following Table 1.

TABLE 1

| Type of grafted vinyl compound | Irradiating temperature (° C.) | Polymerization temperature (° C.) | Polymerization period (min.) | Percentage of grafted vinyl compound | Percentage of produced homopolymer |
|---|---|---|---|---|---|
| 2-vinylpyridine | −30 | 30 | 15 | 10.7 | 0 |
| Do | −30 | 30 | 40 | 28.0 | 2 |

Graft-copolymerized polypropylene thus obtained was mixed with polypropylene in such different proportions that the weight of grafted 2-vinylpyridine were 1%, 3% and 5%, respectively, based on the total weight of the resulting compositions.

After an amount of antioxidant was added to the polypropylene compositions prepared as above, the mixtures were pelletized by an extruder and formed into press-sheets having thickness of 0.1 mm., respectively.

By using these sample press-sheets, the dyeing tests were performed as follows:

(1) Dyeing bath:
  Dyestuff (1.1% Polar Red GRS 130%, Giegy-made) _____ mg__ 30
  Acetic acid _____ mg__ 60
  Glauber's salt _____ mg__ 200
  Water _____ g__ 100
  Press-sheet _____ g__ 2

(2) Heating condition:
Temperature was raised from a room temperature to 100° C. in 50 minutes and maintained at that temperature for 40 minutes.

(3) Results:
The visible ray spectra of the dyeing solution were measured before and after the dyeing tests. The less the light absorption, the more dyestuff were transferred and absorbed onto the sheets. The results of light absorptions measured by suitably diluting the dyeing solution are shown in the following Table 2.

TABLE 2

| Sample | Percentage by weight 2-vinyl-pyridine[1] | Light absorption (510 mμ) Before dyeing | Light absorption (510 mμ) After dyeing |
|---|---|---|---|
| Polypropylene | | 0.40 | 0.40 |
| 28% 2-vinylpyridine graft copolymerized polypropylene | 1 | 0.40 | 0.33 |
| Do | 3 | 0.40 | 0.30 |
| Do | 5 | 0.40 | 0.26 |

[1] After mixing with polypropylene based on the total weight of the resulting composition.

EXAMPLE 2

Methyl acrylate graft-copolymerized polypropylene and vinyl acetate graft-copolymerized polypropylene were prepared in accordance with the same irradiating condition and polymerization method as in Example 1.

The polymerization conditions and the results are shown in the following Table 3.

TABLE 3

| Type of grafter vinyl compound | Irradiating temperature (° C.) | Polymerization temperature (° C.) | Polymerization period (min.) | Percentage of grafted vinyl compound | Percentage of produced homopolymer |
|---|---|---|---|---|---|
| Methylacrylate | −30 | 30 | 12 | 16.3 | 0 |
| Do | −30 | 30 | 50 | 59.9 | 2.5 |
| Vinyl acetate | −30 | 30 | 15 | 6.0 | 0 |
| Do | −30 | 30 | 30 | 18.3 | 0.4 |

Graft-copolymerized polypropylene thus obtained were mixed with polypropylene so that the weights of grafted methylacrylate and vinyl acetate were 1%, 3% and 5%, respectively, based on the total weights of the resulting compositions.

After an amount of antioxidant was added to the polypropylene compositions prepared as above, the mixtures were pelletized by an extruder and formed into press-sheets having thickness of 0.1 mm. respectively.

By using these sample press-sheets, the dyeing tests were performed as follows:

(1) Dyeing bath:
  Dyestuff (Setaron Red BL, Giegy-made) __mg__ 20
  Liponex OC (Product of Lion Yushi Co., Ltd., Japan) _____ mg__ 20
  Ammonium sulfate _____ mg__ 20
  Methyl salicylate _____ mg__ 200
  Water _____ g__ 100

(2) Heating condition:
The temperature was maintained at 60° C. for 10 minutes and thereafter raised to 100° C. in 45 minutes and maintained at that temperature for 90 minutes.

(3) Results:
The light absorptions before and after the dyeing were measured as in Example 1. The results are shown in the following Table 4.

TABLE 4

| Sample | Percentage by weight of grafted vinyl compound[1] | Light absorption (550 mμ) Before dyeing | Light absorption (550 mμ) After dyeing |
|---|---|---|---|
| Polypropylene | | 0.40 | 0.40 |
| 59.9% methyl acrylate graft copolymerized polypropylene | 1 | 0.40 | 0.35 |
| Do | 3 | 0.40 | 0.30 |
| Do | 5 | 0.40 | 0.25 |
| 18.3% vinyl acetate graft copolymerized polypropylene | 1 | 0.40 | 0.38 |
| Do | 3 | 0.40 | 0.34 |
| Do | 5 | 0.40 | 0.30 |

[1] After mixing with polypropylene based on the total weight of the resulting composition.

EXAMPLE 3

31% acrylic acid graft-copolymerized polypropylene was prepared according to the procedures as in Examples 1 and 2, and was mixed with polypropylene in such a proportion that the weight of grafted acrylic acid was 5% by weight based on the total weight of the resulting composition.

Likewise, 34% vinylacetate graft-copolymerized polypropylene prepared same as above was mixed with polypropylene to give a composition containing 10% by weight of vinyl acetate based on the total weight of the composition.

These two sample compositions were formed respectively into press-sheets having thicknesses of 0.15 mm.

After Type G printing ink for polypropylene were applied, these test sheets were allowed to stand overnight in a room regulated at 20° C. and 50% humidity. Thereafter, an adhesive tape having 18 mm. width, was pressed flatly by a hand onto the surface of each respective sample sheet, and peeled off by a hand, then the areas of ink layers left unpeeled were measured.

The results are shown in the following Table 5:

TABLE 5

| Sample | Percentage by weight of grafted vinyl compound[1] | Area left unpeeled, percent |
|---|---|---|
| Polypropylene | | 0 |
| 31% acrylic acid graft copolymerized polypropylene | 5 | 70 |
| 34% vinyl acetate graft copolymerized polypropylene | 10 | 50 |

[1] After mixing with polypropylene based on the total weight of the resulting composition.

NOTE.—Said test sheets are stabilized by incorporation of antioxidant.

EXAMPLE 4

Graft-copolymerized polypropylenes containing 20% by weight of grafted acrylic acid and grafted methyl acrylate were prepared according to the procedures as in Example 1, respectively.

Sample compositions were prepared by mixing these graft-copolymerized polypropylene obtained in the above with polypropylene so that the weights of grafted acrylic acid and grafted methyl acrylate were 3% based on the total weight of the resulting compositions, respectively.

These sample compositions were, after mixed with an amount of antioxidant, formed into press-sheets having thicknesses of 0.1 mm.

By using these sample sheets, antistatic properties were tested as follows:

Corona impression voltage _____ kv__ 7
Corona impression gap _____ cm__ 5
Corona impression period _____ min__ 3

These sample sheets were electrified by electrons for a predetermined period of time under the conditions as described above and immediately transferred to a rotating sector side in a gap of 2 cm. to measure the attenuation of electrified voltage. The results are shown in the following Table 6:

TABLE 6

| Sample | Percentage by weight of vinyl compound [1] | Electrified voltage measured as the lapse of time (kv.) | | | |
|---|---|---|---|---|---|
| | | 0 min. | 1 min. | 2 min. | 3 min. |
| Polypropylene | | 2.8 | 2.8 | 2.8 | 2.8 |
| 20% methyl acrylate graft copolymerized polypropylene | 3 | 2.5 | 2.0 | 1.8 | 1.5 |
| 20% acrylic acid graft copolymerized polypropylene | 3 | 2.5 | 1.9 | 1.4 | 1.1 |

[1] After mixing with polypropylene based on the total weight of the resulting composition.

EXAMPLE 5

1,000 g. of isotactic polypropylene having a density of 0.90 g./cm.$^3$, an intrinsic viscosity of 1.38 as measured in tetraline at 135° C., and a particle size of finer than 150 mesh, were contained in a bag made of a polyethylene film of 0.05 mm. thickness and the bag was placed in a vat-like container which was cooled to −30° C. by Dry Ice-methanol and the content was subjected to the irradiation of an electronic ray emitted from a linear accelerator having an output of 750 w. Immediately after the completion of the irradiation, the content was put into methanol solution containing both 2-methyl-5-vinylpyridine and ethyl acrylate and the graft copolymerization were effected therein to give graft-copolymerized copolymers having different contents of 2-methyl-5-vinylpyridine and ethyl acrylate as specified in the following table. After the completion of the reaction, graft-copolymerized products were taken out and homopolymer was extracted therefrom with acetone for 24 hours and dried.

The percentages of total of grafted 2-methyl-5-vinylpyridine and ethyl acrylate were calculated from the increase in weight based on the weight of polypropylene, and also, the percentage of grafted 2-methyl-5-vinylpyridine was measured by a nitrogen analysis. These results are shown in the following Table 7:

TABLE 7

| Graft-copolymerized polymers | Irradiation dose (M rad) | Polymerization temperature (° C.) | Polymerization period (min.) | Percentage of grafted 2-methyl-5-vinylpyridine | Percentage of total grafted [1] | Percentage of produced homopolymer |
|---|---|---|---|---|---|---|
| A | 1 | 38 | 60 | 19.1 | 24.0 | 0 |
| B | 1 | 38 | 60 | 12.8 | 16.7 | 0.1 |
| C | 1 | 35 | 30 | 6.6 | 8.8 | 0.1 |

[1] 2-methyl-5-vinyl-pyridine and ethyl acrylate.

The samples for dyeing tests were prepared in the following manner:

The graft-copolymerized polypropylene obtained as above was mixed with polypropylene in such a proportion that the weight of grafted 2-methyl-5-vinylpyridine was 3% based on the total weight of the resulting composition. Then, the composition thus prepared was, after mixed with an amount of antioxidant, pelletized by an extruder and formed into press-sheets having thicknesses of 0.1 mm.

The dyeing bath and dyeing conditions are shown in the following Table 8:

TABLE 8

Dyeing bath:
  Dyestuff (1.1% Polar Red GRS 130%, Geigy-made) _____ mg__ 20
  Acetic acid _____ mg__ 60
  Glauber's salt _____ mg__ 200
  Pure water _____ g__ 100
  Press-sheet _____ g__ 2

(Heating conditions: The temperature was raised from 20° C. to 100° C. in 50 minutes and maintained at that temperature for 40 minutes.)

The observation of dispersibility of dyestuff after the soaping was performed as follows:

Dyed sample sheets were sliced in the thickness of 10 micron by a microtome and the cross-sections were examined by an optical microscope (×400), and the dispersibility was judged by giving four grades, i.e., normal, fair, good and excellent.

The results are shown in the following Table 9, and for comparison, the results obtained with polypropylene and polypropylene which was grafted with 2-methyl-5-vinylpyridine alone are also shown therein:

TABLE 9

| Sample | Percentage by weight of grafted vinyl compound [1] | Dispersibility of dyestuff |
|---|---|---|
| Polypropylene | | None. |
| 15% 2-methyl-5-vinylpyridine graft copolymerized polypropylene | 3 | Normal. |
| A | 3 | Good. |
| B | 3 | Do. |
| C | 3 | Excellent. |

[1] After mixing with polypropylene based on the total weight of the resulting composition.

EXAMPLE 6

Graft copolymerizations of polypropylene were repeated according to the same procedures as in Example 5 and varying the doses of irradiation as specified in the following Table 10, and sample graft-copolymerized polypropylene compositions having substantially the same weight of grafted vinyl compound based on the total weights of the resulting compositions were prepared.

TABLE 10

| Graft-copolymerized polymers | Irradiation dose (M rad) | Polymerization temperature (° C.) | Polymerization period (min.) | Percentage of grafted 2-methyl-5-vinylpyridine | Percentage of total grafted [1] | Percentage of produced homopolymer |
|---|---|---|---|---|---|---|
| D | 0.5 | 38 | 30 | 14.9 | 20.0 | 0.1 |
| E | 1.0 | 38 | 30 | 14.9 | 19.3 | 0.1 |
| F | 1.5 | 38 | 30 | 14.3 | 18.3 | 0.1 |

[1] 2-methyl-5-vinyl-pyridine and ethyl acrylate.

From the above table, it is presumed that the increase in the dose of irradiation results in the shortening of chain length of grafted vinyl polymer and increase in the numbers of chain of grafted vinyl polymer.

The dyeing tests were repeated under the same conditions as specified in Table 8 of Example 5, and the results are shown in the following Table 11, which also shows, for comparison, the result obtained with polypropylene grafted with 2-methyl-5-vinylpyridine alone.

TABLE 11

| Sample | Percentage by weight of grafted vinyl compound [1] | Dispersibility of dyestuff |
|---|---|---|
| 15% 2-methyl-5-vinylpyridine graft-co-polymerized polypropylene | 3 | Normal. |
| D | 3 | Fair. |
| E | 3 | Good. |
| F | 3 | Excellent. |

[1] After mixing with polypropylene based on the total weight of the resulting composition.

It is noted from the above table that the more the irradiation dose, the better the dyeability.

EXAMPLE 7

Graft-copolymerization of polypropylene was repeated according to the same procedures as in Example 5 except that 2-vinylpyridine was substituted for 2-methyl-5-vinylpyridine.

The results of the dyeability and dispersibility tests coincided with the results of Examples 5 and 6 as shown in the following Tables 12 and 13:

TABLE 12

| | |
|---|---|
| Graft copolymerized polymer | G |
| Irradiation dose (M rad.) | 1.0 |
| Polymerization temperature (° C.) | 38 |
| Polymerization period (min.) | 60 |
| Percentage of grafted 2-vinylpyridine | 16.1 |
| Percentage of grafted 2-vinylpyridine and ethyl acrylate | 20.0 |
| Percentage of produced homopolymer | 0.1 |

TABLE 13

| Sample | Percentage by weight of grafted 2-vinyl-pyridine [1] | Dispersibility of dyestuff |
|---|---|---|
| 15% 2-vinylpyridine graft copolymerized polypropylene.[2] | 3 | Normal. |
| G | 3 | Good. |

[1] After mixing with polypropylene based on the weight of the total weight of the resulting composition.
[2] Polypropylene grafted with 2-vinylpyridine alone.

EXAMPLE 8

Graft copolymerization of polypropylene were repeated according to the same procedures as in Example 5 except that the proportions of 2-methyl-5-vinylpyridine to ethyl acrylate were varied, and the dyeability and the dispersibility were examined as shown in the following Tables 14 and 15:

TABLE 14

| Graft-copolym-erized polymers | Irradi-ation dose (M rad) | Polym-eriza-tion tem-perature (° C.) | Polym-eriza-tion period (min.) | Percent-age of grafted 2-methyl-5-vinyl-pyridine | Percent-age of total grafted [1] | Percent-age of pro-duced homo-polymer |
|---|---|---|---|---|---|---|
| H | 1.0 | 38 | 60 | 12.0 | 32.2 | 0.1 |
| I | 1.0 | 38 | 60 | 14.6 | 31.6 | 0.1 |
| J | 1.0 | 38 | 30 | 19.1 | 35.0 | 0.1 |

[1] 2-methyl-5-vinyl-pyridine and ethyl acrylate.

TABLE 15

| Sample | Percentage by weight of grafted 2-methyl-5-vinylpyridine [1] | Dispersibility of dyestuff |
|---|---|---|
| 15% 2-methyl-5-vinylpyridine graft-co-polymerized polypropylene [2] | 3 | Normal. |
| H | 3 | Excellent. |
| I | 3 | Good. |
| J | 3 | Do. |

[1] After mixing with polypropylene based on the total weight of the resulting composition.
[2] Polypropylene grafted with 2-methyl-5-vinylpyridine alone.

EXAMPLE 9

Isotactic polypropylene having a density of 0.90 g./cm.$^3$, an intrinsic viscosity of 1.38 as measured in Decalin at 135° C., and a particle size of finer than 150 mesh were subjected to the irradiation of gamma ray of 3,000 Curie emitted from $^{60}$Co while cooled to −30° C. by Dry Ice-methanol, and put into 2-vinylpyridine, immediately after the completion of irradiation, and the temperature was raised to 30° C. After allowed to stand for a predetermined period of time, polypropylene powder was taken out and homopolymer was extracted therefrom with acetone for 24 hours and dried.

The percentage of grafted 2-vinylpyridine was calculated from the increase in weight based on the weight of polypropylene.

The polymerization conditions and the results are shown in the following Table 16:

TABLE 16

| Type of grafted vinyl compound | Irradi-ation temper-ature (° C.) | Polym-eriza-tion temper-ature (° C.) | Polym-eriza-tion period (min.) | Percent-age of grafted 2-vinyl-pyri-dine | Percent-age of pro-duced homo-polymer |
|---|---|---|---|---|---|
| 2-vinylpyridine | −30 | 30 | 15 | 10.0 | 0 |
| Do | −30 | 30 | 40 | 27.0 | 1 |

Graft-copolymerized polypropylenes thus obtained were mixed with polypropylenes in such different proportions that the weights of grafted 2-vinylpyridine were 1%, 3% and 5%, respectively, based on the total weight of the resulting compositions.

The compositions prepared as above were, after mixed with an amount of antioxidant, pelletized by an extruder and formed into press-sheets of 0.1 mm. thickness, respectively.

By using these sample press-sheets, the dyeing tests were performed according to the same procedures as in Example 1 and the results are shown in the following Table 17:

TABLE 17

| Sample | Percentage by weight of grafted 2-vinyl-pyridine [1] | Light absorption (510 mμ.) Before dyeing | After dyeing |
|---|---|---|---|
| Polypropylene | | 0.40 | 0.40 |
| 27% 2-vinylpyridine graft copolymerized polypropylene | 1 | 0.40 | 0.33 |
| Do | 3 | 0.40 | 0.30 |
| Do | 5 | 0.40 | 0.26 |

[1] After mixing with polypropylene based on the total weight of the resulting composition.

EXAMPLE 10

Methyl acrylate graft-copolymerized polypropylene and vinylacetate graft-copolymerized polypropylene were prepared according to the same irradiation conditions and polymerization method as in Example 9.

The polymerization conditions and the results are shown in the following Table 18:

TABLE 18

| Type of grafted vinyl compound | Irradi-ation temper-ature (° C.) | Polym-eriza-tion temper-ature (° C.) | Polym-eriza-tion period (min.) | Percent-age of grafted vinyl com-pound | Percent-age of pro-duced homo-polymer |
|---|---|---|---|---|---|
| Methyl acrylate | −30 | 30 | 12 | 15.1 | 0 |
| Do | −30 | 30 | 50 | 55.5 | 0.6 |
| Vinyl acetate | −30 | 30 | 12 | 5.4 | 0 |
| Do | −30 | 30 | 30 | 18.6 | 0.2 |

55.5% methyl acrylate graft-copolymerized polypropylene and 18.6% vinyl acetate graft-copolymerized polypropylene thus obtained were mixed with polypropylene in such different proportions that the weights of methyl acrylate or vinyl acetate were 1%, 3% and 5%, respectively, based on the total weight of the resulting compositions.

These compositions prepared as above were pelletized by an extruder after mixed with an amount of antioxidant, and formed into press sheets of 0.1 mm. thickness, respectively.

By using these sample sheets, the dyeing tests were performed according to the same procedures as in Example 2 and the results are shown in the following Table 19:

TABLE 19

| Sample | Percentage by weight of grafted vinyl compound [1] | Light absorption (550 mμ) | |
|---|---|---|---|
| | | Before dyeing | After dyeing |
| Polypropylene | | 0.40 | 0.40 |
| 55.5% methyl acrylate grafted polypropylene | 1 | 0.40 | 0.35 |
| Do | 3 | 0.40 | 0.29 |
| Do | 5 | 0.40 | 0.22 |
| 18.6% vinyl acetate graft copolymerized polypropylene | 1 | 0.40 | 0.35 |
| Do | 3 | 0.40 | 0.30 |
| Do | 5 | 0.40 | 0.27 |

[1] After mixing with polypropylene based on the total weight of the resulting composition.

EXAMPLE 11

25% acrylic acid graft copolymerized polypropylene was prepared according to the procedures as described in Example 10, and was mixed with polypropylene in such a proportion that the weight of the grafted acrylic acid is 5% based on the total weight of the resulting composition.

Likewise, 36.5% vinyl acetate graft-copolymerized polypropylene was prepared as above and was mixed with polypropylene in such a proportion that the weight of the grafted vinyl acetate is 10% based on the weight of the resulting composition.

These two compositions were formed respectively into press-sheets of 0.1 mm. thickness.

After Type G printing ink for polypropylene, were applied, these test sheets were allowed to stand overnight in a room regulated at 20° C. and 50% humidity. Thereafter, an adhesive tape having 18 mm. in width, was pressed flatly by a hand onto the surface of each respective sample sheet, and peeled off by a hand, then, the area of ink layers left unpeeled were measured. These sample sheets were stabilized by an antioxidant.

The results are shown in the following Table 20:

TABLE 20

| Sample | Percentage by weight of grafted vinyl compound [1] | Area left unpeeled (percent) |
|---|---|---|
| Polypropylene | | 0 |
| 25% acrylic acid graft copolymerized polypropylene | 5 | 70 |
| 36.5% vinyl acetate graft copolymerized polypropylene | 10 | 60 |

[1] After mixing with polypropylene based on the total weight of the resulting composition.

EXAMPLE 12

Graft-copolymerized polypropylene containing 20% by weight of grafted acrylic acid and grafted methyl acrylate were prepared according to the procedures as in Example 9, respectively.

Sample compositions were prepared according to the same procedures as in Example 4 and the antistatic properties were tested as in Example 4. The results are shown in the following Table 21:

TABLE 21

| Sample | Percentage by weight of grafted vinyl compound [1] | Electrified voltage measured as the lapse of time (kv.) | | | |
|---|---|---|---|---|---|
| | | 0 min. | 1 min. | 2 min. | 3 min. |
| Polypropylene | | 2.8 | 2.8 | 2.8 | 2.8 |
| 20% methyl acrylate graft copolymerized polypropylene | 3 | 2.5 | 2.0 | 1.8 | 1.5 |
| 20% acrylic acid graft copolymerized propylene | 3 | 2.5 | 1.9 | 1.4 | 1.1 |

[1] After mixing with polypropylene based on the total weight of the resulting composition.

What we claim is:

1. Polypropylene composition comprising polypropylene and polypropylene graft-copolymerized with a vinylpyridine and an acrylic ester in such a proportion that the weight of said grafted vinylpyridine is from 0.5 to 10% based on the weight of said composition, said graft-copolymerized polypropylene having from 5 to 80% by weight of grafted vinylpyridine and acrylic ester based on the weight of polypropylene and being prepared by subjecting polypropylene to an irradiation of ionizing radiation at a temperature below 5° C. in the presence of oxygen and copolymerizing the irradiated polypropylene with a mixture of a vinylpyridine and an acrylic ester having a ratio of 90–10:10–90 by weight, said vinylpyridine being a member selected from the group consisting of 2-vinylpyridine, 4-vinylpyridine, 2-methyl-5-vinylpyridine and 2-ethyl-5-vinylpyridine, and said acrylic ester being a member selected from the group consisting of methyl acrylate, ethyl acrylate, methyl methacrylate and ethyl methacrylate.

2. A composition according to claim 1 wherein the mixture of said vinylpyridine and said acrylic ester has a ratio of 70–30; 30–70 by weight.

3. Polypropylene composition according to claim 1 wherein said ionizing radiation is high energy electrons or gamma rays.

References Cited

UNITED STATES PATENTS

| 3,088,791 | 5/1963 | Cline et al. | 204—159.15 |
| 3,115,418 | 12/1963 | Magat et al. | 204—159.15 |

FOREIGN PATENTS 879,195  10/1961  Great Britain.

GEORGE F. LESMES, Primary Examiner

U.S. Cl. X.R.

8—55; 204—159.15; 260—876, 878